United States Patent [19]

Falicoff et al.

[11] Patent Number: 4,877,675

[45] Date of Patent: Oct. 31, 1989

[54] LIGHT TRANSMITTING OR REFLECTIVE SHEET RESPONSIVE TO TEMPERATURE VARIATIONS

[76] Inventors: Waqidi Falicoff, 585 Orchard St., Ashland, Oreg. 97520; Richard Delano, Box 96 Old Field Rd., Setauket, N.Y. 11733; Chad J. Raseman, 644 West San Francisco, Santa Fe, N. Mex. 87501

[21] Appl. No.: 250,868

[22] Filed: Sep. 29, 1988

[51] Int. Cl.$^4$ .............................................. B32B 3/00
[52] U.S. Cl. ..................................... 428/204; 428/34; 428/178; 428/212; 428/913; 156/99; 156/100; 427/162; 427/164; 427/165; 427/331; 427/372.2; 350/266; 350/312; 350/353
[58] Field of Search ....................... 350/266, 312, 353; 428/34, 178, 204, 212, 913; 156/99, 100; 427/162, 164, 165, 331, 372.2

[56] References Cited

U.S. PATENT DOCUMENTS

| | | | |
|---|---|---|---|
| 3,953,110 | 4/1976 | Chahroudi | 350/266 |
| 3,987,781 | 10/1976 | Nozik et al. | 427/168 |
| 4,260,225 | 4/1981 | Walles | 350/353 |
| 4,307,942 | 12/1981 | Chahroudi | 350/266 |
| 4,772,506 | 9/1988 | Siol et al. | 428/212 |

Primary Examiner—Thurman K. Page
Assistant Examiner—P. J. Ryan
Attorney, Agent, or Firm—Eliot S. Gerber

[57] ABSTRACT

In greenhouses and other stuctures an excessive amount of sunlight on a hot day may cause overheating or may cause uneven lighting. A sheet is provided which is normally transparent but which becomes white and light-reflective at a predetermined temperature to help keep the structure cooled or help keep its lighting at a constant level. This color is reversible so that the sheet becomes transparent when the temperature falls. In one embodiment, the sheet consists of a unitary transparent plastic resin structure formed with elongated cells which are filled with a thick and viscous gel containing poly (vinyl methyl ether) or other suitable "cloud point" material. The gel helps prevent loss of water through the cell walls and prevents gaps which may occur from migration over repeated cycles of precipitation of the cloud point material, i.e., it helps keep the mixture homogeneous. In another embodiment the sheet comprises a plastic resin film which is coated with a liquid mixture including bentonite and a water solution of poly (vinyl methyl ether) and the mixture is dried and later re-wetted at the assembly site.

15 Claims, 1 Drawing Sheet

LIGHT TRANSMITTING OR REFLECTIVE SHEET RESPONSIVE TO TEMPERATURE VARIATIONS

BACKGROUND OF THE INVENTION

It is known that certain materials will change their color and their ability to transfer light under the influence of an electrical field. This property is widely used in liquid crystal display electronic devices such as watches. However, the material is relatively expensive and has not been generally applied in greenhouses or other buildings. It has also been suggested that certain chemicals will reversibly change their state and their light transmission properties with changes in temperature.

A series of patents has issued which indicate that certain specific organic chemicals will reversibly change their state and their light transmission properties with changes in temperature. These patents indicate that specific organic polymers will, at a "cloud point", go into, or out of, solution when their temperature is raised. At their cloud point, when they are deposited out of the solution, the color or light transmission will change. However, commercially these materials have not been incorporated in flexible plastic resin films.

In U.S. Pat. Nos. 3,953,110 and 4,307,942 to Day Charoudi, a temperature responsive visible radiation control, polyvinylmethylether (PVME) is "... incorporated into a gel matrix by crosslinking or applied as an emulsion in a paint"(U.S. pat. No. 3,953,110, column 4, lines 54–56). Charoudi uses PVME and "cross linked hydroxyethyl methacrylate-hydroxyethyl acrylate copolymer" as the "gel or matrix" (U.S. Pat. No. 4,307,942, column 3, lines 44–53). In U.S. Pat. No. 4,260,225 to Walles a cloud-point polymer, i.e., having inverse solubility with a temperature rise, based on N-vinyl-5-methyl-2-oxazolidinone (PVO-M).

In a greenhouse, when the temperature rises past a certain point, the plants may be damaged. It would be useful if the greenhouse wall could change its light transmission property at a predetermined temperature point to avoid an excessive amount of sunlight from entering the greenhouse and raising its temperature. Similarly, in other buildings, if the windows or walls could reflect more sunlight, at a predetermined rise in ambient temperature, it may be possible to reduce the air conditioning load, control the sunlight entering the building or, in other ways, improve the building's functions.

OBJECTIVES AND FEATURES OF THE INVENTION

It is a feature of the present invention to provide a relatively rigid plastic structure sheet having parallel and connected hollow cells which sheet will reversibly alter its light transmission properties when subjected to changes in ambient temperature.

It is a further objective of the present invention to provide such a composite flexible film material and a plastic structure, both of which will be relatively longer lived and will not dry out or crack or otherwise fail in usage for at least one year under room temperature conditions.

It is a further objective of the present invention to provide such a composite film material and plastic structure, both of which will be relatively low in cost and light in weight as compared to glass sheets, so that it may be used in greenhouses, domes and other architectural uses in which the cost or weight of glass sheets would make their use impractical.

It is a further objective of the present invention to provide such a composite film material and plastic structure, both of which will be relatively stable over the period of its use and will not permit sagging, i.e., collection of the fluid material in spots, or gapping, i.e., the absence of the fluid material from other spots.

It is a further objective of the present invention to provide a relatively rigid plastic structure, which will reversibly change its light reflective property at a predetermined temperature and which will give a higher "black-out", i.e., the prevention of light being transmitted.

It is a feature of the present invention, in one embodiment, to provide a semi-rigid plastic resin channel sheet structure which has a top sheet, a bottom sheet and a series of parallel side walls forming elongated enclosed cells. The cells contain a gel including polyvinyl methyl ether (PVME) and one or more non-ionic surfactants to provide a wide range of temperature control, depending upon the temperature control additives. The temperature control is primarily determined by the choice of non-ionic surfactant by varying the ratio of non-ionic surfactants to PVME and by varying the concentration of both the PVME and the non-ionic surfactants. The gel also contains two gelling agents; the first provides a polymer matrix and the second, which is a hydroscopic polymer, binds the water within the gel and helps prevent evaporation.

It is a feature of the present invention, in one embodiment, to provide a method of forming a heat-responsive sheet. The sheet, after formation, is transparent to light when cool and reflective when it is heated. The method comprises, in order, the steps of coating one side of a transparent plastic resin film with a liquid composition which contains bentonite and a water solution of polyvinyl methyl ether having a predetermined cloud point, preferably a plastic resin film.

The next steps are to dry the coated film, transport it in its dried state and, at the location of assembly, add water to wet the coating. The wetted coated surface is then applied to a transparent sheet to form a sandwich. Preferably both the plastic resin films are low water vapor permeability films. The coating, when applied, may also contain salts to lower the cloud point.

BRIEF DESCRIPTION OF THE DRAWINGS

Other objectives and features of the present invention will be apparent from the following detailed description taken in conjunction with the accompanying drawings.

In the drawings.

DETAILED DESCRIPTION OF THE INVENTION

The present invention utilizes a material which is responsive to changes in ambient temperature. The material has a "cloud point" at which the color of the material changes at a predetermined temperature. The preferred material is poly(vinyl methyl ether), which is a linear homopolymer methyl vinyl ether (hereinafter PVME). The PVME material is available as a resin under the trademark Gantrez M polymer from GAF Corporation (New York City). More specifically, the preferred material is GAF Gantrez M154, which is a solution of poly(vinyl methyl ether) in water at a 50% solids level. An alternative PVME polymer is "Lutonal" M40 from BASF (Wyandotte, Michigan).

The "cloud point" indicates the temperature at which the material will change its color, due to precipitation out of solution. Generally, materials, as they are heated, become more soluble in solution and, as the material is cooled, may at a certain critical temperature precipitate from the solution. However, with PVME the reaction to temperature change is opposite. It is in solution at the lower temperature and precipitates out at higher temperatures. At lower temperatures the PVME material is almost perfectly transparent. However, at higher temperatures, after the cloud point is reached, the material becomes white and will reflect light. Similarly, certain non-ionic surfactants also exhibit cloud point behavior. In addition, non-ionic surfactants, as a chemical group, could be used by themselves, without PVME, to give a white-out or haze control.

Preferably, a special composition is mixed which consists of the PVME, which is poly(vinyl methyl ether), Bentonite clay and other materials in the following proportions:

|  | Part by Volume |
|---|---|
| Poly(vinyl methyl ether) M154 - GAF | 211 cc |
| Water | 211 cc |
| SH, a surfactant wetting agent from DuPont | 4 cc |
| Methyl alcohol | 36 cc |
| Glycolic acid | 3 cc |
| Bentonite (EW Bentone) | 11 cc |

Bentonite is a soft, porous, moisture-absorbing clayey mineral. It essentially contains montmorillonite (RMg $Al_5$ $Si_{12}$ $O_{30}$ $(OH)_6$. n $H_2$ O, where R represents exchangeable bases, i.e., hydrous aluminum silicate. The preferred bentonite is "EW Bentone" available from NL Industries (New Jersey) and is in the range 2–8% (vol.).

This mixture is then applied on one side of a transparent plastic resin film, for example, by spraying or rolling. The mixture at that point has the consistency of a thick paste. The mixture is then dried, forming a thin tan-colored coating on the plastic film. The film is now ready for shipment and may be rolled onto itself to form a roll. The dried coating is not tacky and does not stick to the material onto which it is rolled. Consequently, an intermediate separation sheet is not required. The coated film is shipped to the field in its dried and rolled status.

Figure 1:
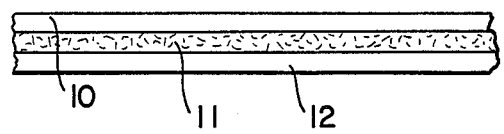
FIG. 1 is an enlarged cross-sectional view of the composite film material of the first embodiment of the present invention.
Figure 2:
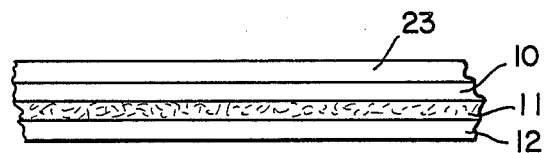
FIG. 2 is a view of the material of FIG. 1 installed in face-to-face contact with a heat-responsive sheet.

In the field the coating is reconstituted by the addition of water which is preferably added by spraying the coating with a fine water spray. As shown in FIG. 1, the film 10, with its wetted coating 11, is then applied to a transparent sheet 12 which is preferably a rigid or flexible sheet of plastic. As shown in FIG. 2, the plastic sheet 12 to which it is applied may also be a plastic resin film. Consequently, the wetted cloud point mixture 10 is sandwiched between two layers of plastic resin film. Preferably both the films 10,12 are of low-water-pressure permeability, i.e., a moisture barrier. The preferred films are Mylar (TM of Dow Chemical Corp.) and Tedlar (TM of DuPont) and Saran (TM of Dow Chemical Corp. for a vinylidene chloride-vinyl chloride copolymer having copolymer crystals). The preferred thickness of the plastic resin film is 2 mils, although film in the range 1–10 mils may be used.

Figure 3:
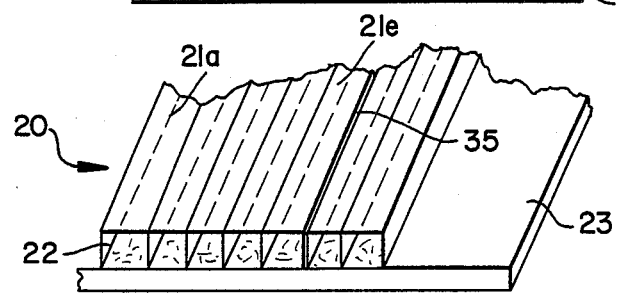
FIG. 3 is a cross-sectional and perspective view of a second embodiment of the present invention employing a single layer of a channel sheet.

In the second embodiment of the present invention, as shown in FIG. 3, material which is responsive to change in ambient temperature is captured in a gel which is held within channels in a relatively structural sheet. As shown in FIG. 3, the sheet member 20 consists of a plurality of elongated cells 21a through 21e. Each cell forms an internal channel and has four walls, so that its cross-sectional shape is a square. Preferably the entire structural sheet 20 is formed, for example, by plastic extrusion from a clear, semi-rigid plastic such as an acrylic polymer or polycarbonate, polyacrylate or coextrusions of materials having complementary physical characteristics, i.e., polysulfone and polyacrylate; the first would protect the second from chemical attack at temperatures about 60° C. The second would act as the UV shield and structural container.

The material within the cells is a special cloud-point mixture which utilizes two gelling agents. The first preferred gelling agent is "Carbopol 940" (TM of B.F. Goodrich), which is a high molecular weight carboxy vinyl polymer. It forms a polymer matrix. The second preferred gelling agent is a hydroscopic polymer, to retain the water in the polymer matrix. A suitable second gelling agent is "Carbopol 910" (TM of B.F. Goodrich).

The cloud-point mixture also contains a non-ionic surfactant. The use of a suitable non-ionic surfactant, in tests, has provided a "black-out", i.e., non-transmittal of light, of over 99% when the cloud-point is reached. Alternatively, by placing the temperature at the cloud-point a partial effect is obtained and the sheet appears hazy, i.e., between white and clear. Also, the use of non-ionic surfactants permits a wide range of temperature control, at least in the temperature range 25°–40° C. The preferred non-ionic surfactants are (i) alkoxylates of linear fatty alcohols; (ii) nonylphenoxy poly (ethyleneoxy) ethanols; and (iii) octylphenoxy poly (ethyleneoxy) ethanols. For example, suitable non-ionic surfactants are LF 600 and LF 711, both available from BASF.

A neutralizer-base, preferably PLURIOL-Q, performs the following functions: (i) it aids in cross-linking the polymers; (ii) it neutralizes the polymer, i.e., maintains a desired pH; and (iii) it helps protect the system against metal-ion contamination. The system also preferably contains a suitable UV inhibitor and antioxidant such as Goodrite 3114 and EDTA (ethylene diamine tetra acetic acid) to help protect against metal ion contamination.

The formula given is by way of an example and does not imply a limitation or restriction to this formula only.

The preferred formula for the cloud-point mixture, for an instantaneous response, is:

| | | |
|---|---|---|
| Non-ionic surfactant | BASF-LF 600 | 5% by weight |
| | BASF-LF 711 | 5% by weight |
| PVME | M40 | 6-8% in 50% water solution - by weight |
| Neutralizer | PLURIOL-Q | 0.5% by weight |
| Gelling agent | Goodrich 940 | 0.3% by weight |
| Hydroscopic polymer | Goodrich 910 | 0.05% by weight |
| Antioxidant | Goodrite 3114 | 50 ppm |
| Anti-metal ion | EDTA | 20-30 ppm |
| The remainder is distilled water | | |

The structural sheet 20 may be used, for example, as the well of a greenhouse. In one embodiment, the structure sheet 20 has applied to it a thin flexible sheet 23, of 2-6 mils in thickness, which is electrically resistive and produces heat when an electrical charge is applied. The sheet 23 is transparent, such as a polyester film, and may have a thin coating of electrically responsive material, preferably indium tin oxide, applied on its surface. When an electrical charge is applied to the sheet 23, its temperature rises. The rise in temperature of the sheet 23 will cause a color change in the structure 20, provided that the rise in temperature of the sheet 23 is sufficient to reach the cloud point of the material within the cells. Alternatively, heat may be obtained from electricity, by screenprinting an electro-conductive ink having a certain resistance, on a top or bottom surface of the sheet 20. The conductive layer may also provide an effective low emissivity layer which reflects infra-red radiation, at night, to help retain heat within a structure. Alternatively, such a low emissivity layer may be used without being used for electrical heating.

Figure 4:
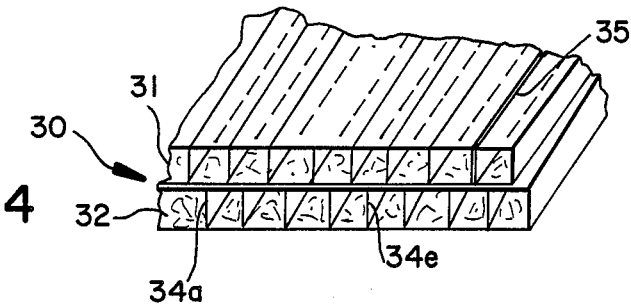
FIG. 4 is a cross-sectional and perspective view of a third embodiment utilizing two layers of channel sheets.

An alternative structure is shown in FIG. 4. In this embodiment the cellular structure 30 comprises a first layer 31, which is the same as the cellular structure 20 of FIG. 3. A second structure 32 is connected to the first cellular structure 31. However, the vertically oriented ribs 33a through 33e of the first layer 31 are staggered, i.e., offset, relative to the ribs 34a through 34e of the underlying second cellular structure 32. In this way, any light which may be transmitted by the ribs is not transmitted through the entire structure as each of the ribs is applied with the center of the temperature responsive field material filling the cell aligned with that rib.

Alternatively, and as shown in FIG. 3 by the dark band 35, the ribs at their ends may be painted with a dark, preferably black, band so as to prevent light transmission through the cellular structure. The black bands prevent light transmission through the transparent ribs (side walls).

Figure 5:
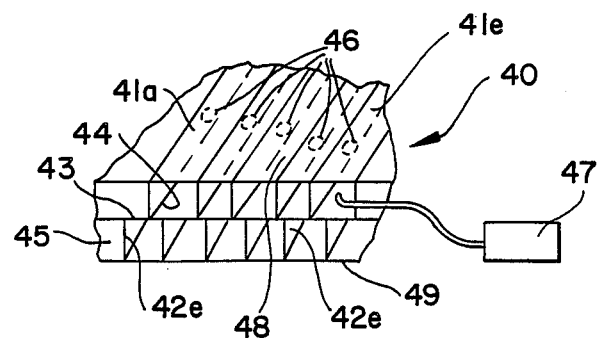
FIG. 5 is a cross-sectional and perspective view of a fourth embodiment utilizing a single honeycomb channel sheet.

A similar structure to that of FIG. 4 is shown in FIG. 5. However, in this embodiment the cellular structure 40 is formed as a single unit preferably by means of plastic extrusion. In this case each rib 41a through 41e is centered on a corresponding cell 42a through 42e. This arrangement prevents light transmission, through the vertically aligned ribs 41a through 41e, from being transmitted through the structure 40. In this embodiment a single horizontal wall 43 separates the top row of cells 44 from the bottom row of cells 45.

The elongated cells of the embodiments in FIGS. 3-5 are closed and sealed at both of the ends of each of the cells. Such sealing prevents loss of water from the gel.

Alternatively, the cells may be sealed at their ends but interconnected by internal holes 45 through their ribs 41a-41e and 42a-42e, see FIG. 5. A drip mechanism 47, which may be a wick connected to a water supply, slowly adds water to the structure 40 to prevent drying of the gel. Such drying may occur due to water vapor loss through the exterior walls (top wall 48 and bottom wall 49).

In an alternative embodiment the side walls - ribs 21a-21e (FIG. 3) are formed of an opaque plastic resin to prevent light transmittal through the sheet.

Preferably the gel is relatively viscous, at least as hard as a gelatin product and preferably as viscous as soft putty.

The gelling of the cloud-point mixture is highly advantageous. It has been found, particularly in vertically aligned structures, that a cloud-point material in a liquid form will tend to migrate, over repeated cycles, and leave gaps. The gaps, instead of turning white with increased temperature, remain transparent. The gel prevents such migration, prevents gaps and maintains the mixture homogeneous.

The gel also prevents or slows-up the loss of water and thereby extends the life of the product. A loss of water through water vapor transmission through the cell walls would cause the cloud point mixture to become dried out and fail.

It has been found that the gel, to be most effective, should be formed into a plurality of layers of cells, preferably three layers. Tests have shown that with a single layer 9 mm thick, light transmittance of 80% below the cloud point (clear) and 2% light transmittance above the cloud point (white and opaque). In contrast, with three layers superimposed, each of 3mm (total thickness 9 pmm) the light transmittance was 55% clear and 0.2% opaque.

Another advantage of the present invention is that it provides a fire retardant property to the structure. The gel is preferably water-based and so helps prevent the plastic cell structure from spreading fire.

What is claimed is:

1. A structure whose light transmission changes with temperature so that at a rise of temperature to a predetermined point it changes from transparency to become reflective, comprising a plastic resin structure having a top wall, a bottom wall, and a plurality of parallel and separated side walls therebetween forming elongated closed cells and a cloud point mixture in a plurality of said closed cells, the cloud point mixture includes a cloud-point polymer which is primarily a water solution of poly(vinyl methyl ether) and which precipitates from solution at a predetermined rise in temperature, a polymer gelling material to form a polymer matrix, and a hydroscopic polymer to help retain water in the mixture.

2. A structure as in claim 1 and further including a non-ionic surfactant.

3. A structure as in claim 1 wherein the polymer gelling agent is carboxy vinyl polymer.

4. A structure as in claim 1 wherein the cloud point mixture consists primarily of poly (vinyl methyl ether).

5. A structure as in claim 1 and further including a third wall parallel to said bottom wall and a further set of side walls between said bottom wall and third wall with said further set of side walls which are walls offset with respect to said first set of side walls.

6. A structure as in claim 1 and further including drip means to supply water on a continuous basis to the gel in each cell.

7. A structure as in claim 1 wherein the gel is thick and viscous and has a viscosity in the range of 1000 to 100,000 CPS.

8. A structure as in claim 1 and further including a pattern composed of a screen-printed transparent ink on one of said to and bottom walls to selectively heat said structure and thereby cause its said change to become reflective.

9. A structure whose light transmission changes with temperature so that at a rise in temperature to a predetermined temperature it changes from transparent to reflective, comprising two transparent sheets and a cloud point mixture which is primarily a water solution of poly (vinyl methyl ether) between said sheets, the cloud point mixture including a cloud-point polymer which precipitates from solution at a predetermined rise in temperature, a polymer gelling material to form a polymer matrix, and a hydroscopic polymer to help retain water in the mixture.

10. A structure as in claim 8 and further including a non-ionic surfactant.

11. A structure as in claim 8 wherein the polymer gelling agent is carboxy vinyl polymer.

12. The method of forming a heat responsive sheet which is, after formation, transparent to light when cool and translucent when heated, comprising the steps, in order, of:
  coating one side of transparent plastic resin film with a liquid composition containing bentonite in the range of 2–8% by volume and a water solution of poly(vinyl methyl ether) having a predetermined cloud point;
  drying the coated film, transporting it in its dried state and, at the location of assembly, adding water to wet the coating;
  applying the wetted coated surface to a transparent sheet to form a sandwich with the said coating retained between transparent sheets to become translucent at its cloud point upon being heated.

13. The method as in claim 12 wherein said coating, when applied, contains salts to lower the cloud point.

14. The method of claims 12 wherein both the transparent plastic resin film and the transparent sheet to which the said wetted coated surface is applied are low water vapor permeability films.

15. The method of claim 12 wherein said liquid composition also contains glycolic acid.

* * * * *